May 24, 1927.  1,629,858
J. W. BROWNING
METHOD AND APPARATUS FOR TESTING SHOVELS
Filed Oct. 7, 1921
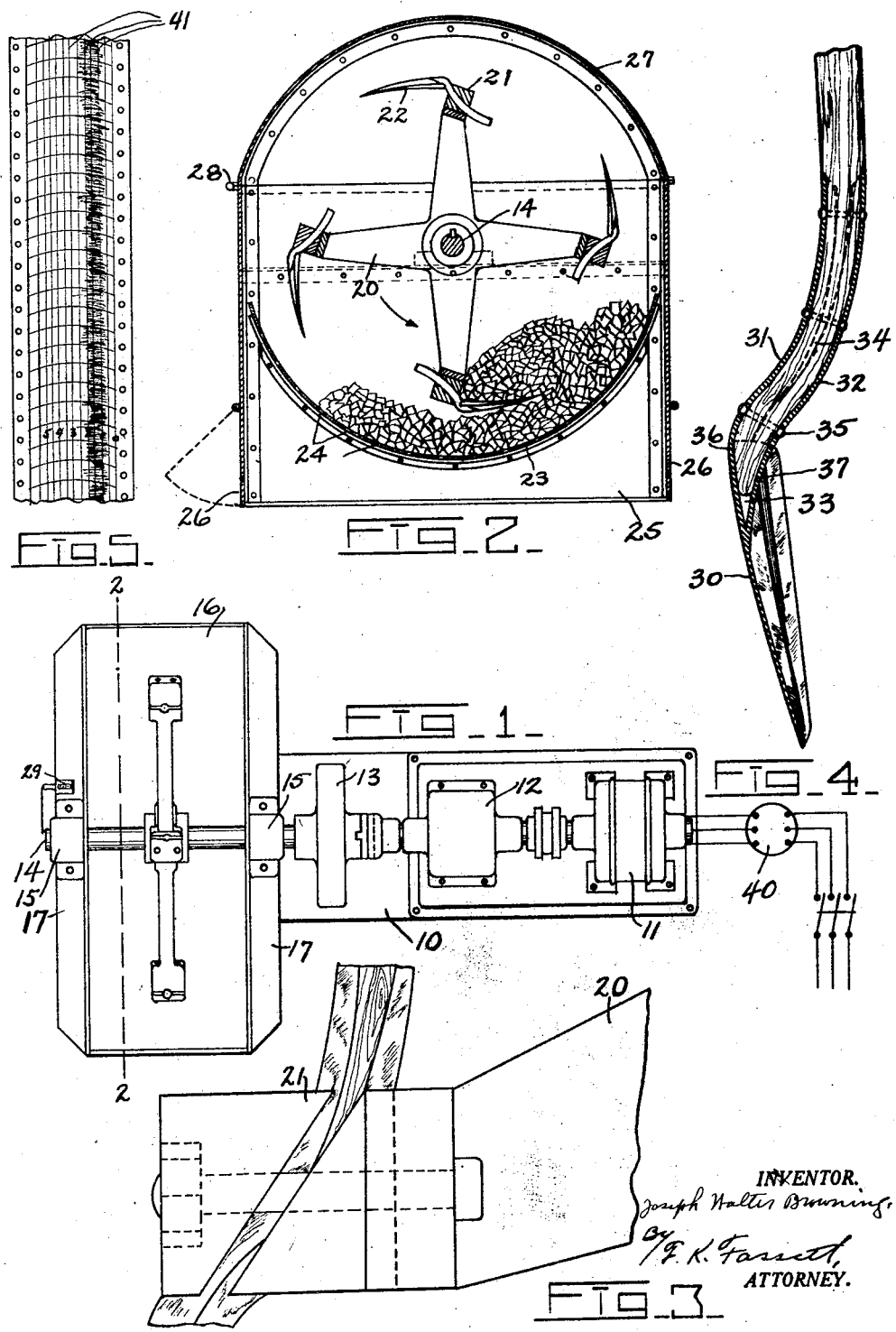

Patented May 24, 1927.

1,629,858

UNITED STATES PATENT OFFICE.

JOSEPH WALTER BROWNING, OF PIQUA, OHIO, ASSIGNOR TO THE WOOD SHOVEL AND TOOL COMPANY, OF PIQUA, OHIO, A CORPORATION OF OHIO.

METHOD AND APPARATUS FOR TESTING SHOVELS.

Application filed October 7, 1921. Serial No. 506,182.

My invention relates to apparatus whereby shovels may in a few hours, or days, be subjected to a test that will try the durability of the metal of which the shovels are made, both as to its capacity to resist wear and to sustain mechanical strain, equal to months or even years of use under normal conditions.

Heretofore there has been no way to discover the weak spots in shovels except by using them. As it took many months, even years in most cases, to develop the defects, it is evident that shovels were lost sight of by the manufacturers long before they wore out. And though the manufacturers received complaints from the purchasers, these were principally of such a general or abstract nature as to be uninstructive. Even where shovels were returned to demonstrate their imperfections, there was usually so much uncertainty as to how much and what character of use the shovels had had, that mere examination of the returned shovels was not enlightening. Furthermore, since it took so long to try out any attempt at improvement, improvements have been both slow and uncertain.

This was one of the problems I found confronting me when I undertook to make improvements to overcome certain well known weaknesses in shovels, even the best of them, found in the markets. To meet this difficulty and enable me to quickly obtain reliable data concerning shovels I was experimenting with, also for the purpose of making impartial comparative tests of my own shovels and those of other makers, I devised the method for testing shovels and the machine for carrying out the method, disclosed in this application. My method is briefly this:

The shovels are made to dig through a mass of material repeatedly, the shovels being held in a position with reference to the direction of their movement through the material substantially such as they would assume while in normal use. Various materials may be used, but I have found crushed granite very satisfactory. It has sufficient abrasive quality to quickly show up the resistivity of the metal, and it has the weight necessary to impose strains on the shovels approximating those which shovels are required to sustain in practice. But if shovels are required for some special service, that is, to handle a particular material, and it is desirable to find out the most suitable metal to use in shovels for that purpose, a quantity of that material may be used in making the tests.

For the purpose of describing the apparatus for carrying out my method of testing shovels I will refer to the accompanying drawing, in which, Figure 1 is a plan view of my machine, with the cover removed;

Figure 2 is a sectional view principally on line 2—2 of Figure 1;

Figure 3 is an enlarged view of a fragment of a shovel-carrying arm, showing the manner of mounting the shovels;

Figure 4 is a longitudinal section of a shovel;

Figure 5 shows a fragment of a chart showing the energy consumed in operating the machine.

Referring now to the drawing, it will be seen that my machine comprises a base plate 10 on which is mounted a motor 11. This is preferably an electric motor and its shaft is connected through a speed reducing device 12 and a shock absorbing device 13 to a shaft 14 mounted to rotate in bearings 15, which are attached to the sides of a hopper 16 by means of angles 17. Within the hopper the shaft carries a plurality of radiating arms 20, each of which is provided with a clamp 21 for the purpose of attaching a shovel 22 to the arm. The shovel handles are sawed off to get them out of the way. The bottom 23 is preferably cylindrical in form and is provided with perforations 24. Below this perforated bottom there is a compartment 25, provided at each end with a door 26. The hopper has a cover 27, mounted on hinges 28. A revolution counter 29 is mounted on one of the angles 17 and is connected by a suitable pitman to the shaft 14.

For the purpose of testing the shovels carried by the arms 20, I put a quantity of material of some suitable kind in the hopper and as the shaft rotates in the direction indicated by the arrow in Figure 2, the shovels are caused to dig through this material, moving in a path substantially such as would be the average path of the shovel when being used manually. The material contained in the hopper has a greater or less abrasive action on the shovels, depending on the character of the material and the quality of the steel in the shovels, and it also imposes mechanical strains on the shovels closely approximating those to which shovels are normally subjected.

In order that this subject may be more clearly understood I will refer to the shovel shown in Figure 4, which is an ordinary shovel comprising a blade 30, a back strap 31 and front strap 32. The lower end of the front strap being broad and spear shaped, is welded to the blade, after which a drift is driven between the blade and front strap to form a pocket 33 for the reception of the wooden handle 34. The extremities of the straps are formed around the wooden handle in the usual way, and secured thereto by rivets 35. In normal use, as a shovel is pushed into the material which is being shoveled, the blade slides with comparative freedom through the material, but the pocket, because of its prominence, is compelled not only to slide through but to displace or compress the material. The shovel, particularly the front strap, is therefore subjected to more or less abrasion, according to the character of the material that is being shoveled. In addition to this the shovel is subjected to certain mechanical strains. After it has been pushed into the material the user generally bears down on the shovel or pulls it toward him. By this act the heel of the shovel, that is the portion opposite the front strap, as at 36 in Figure 2, is made to act as a fulcrum, by which the material lying on the blade is pried loose from the surrounding material. This puts a tensile strain on the front of the pocket, at a point in the vicinity of 37 in Figure 4, and it is here that shovels usually break.

Referring now to Figure 2, it will be seen that the clamps 21 embrace a portion of the shovel handle above the pocket and therefore above the point where shovels usually break. It is evident that in digging through the material contained in the hopper, mechanical force being substituted for manual force a shovel is not only subjected to an abrasive action closely resembling that to which it would be subjected in ordinary use, but also that the weight and inertia of the material in the hopper subjects the shovel to mechanical strains closely resembling those above described. The front strap is subjected to a tensile strain quite similar to that which it would receive when used manually. These results flow from the manner in which the shovels are mounted on the arms. That is, the shovel being supported by a portion of the handle removed from the blade the full strain produced by the shovel plowing through the material in the hopper is thrown on the parts which attach the blade to the handle.

The advantages of testing shovels by the described method are quite obvious. The hopper may be supplied with any suitable material for making the test, but I have found crushed granite very satisfactory. It is put into the hopper in lumps approximately the size of "egg" anthracite coal, and having considerable abrasive quality and being very hard, it does not take long to produce very definite results. The corners of the lumps of granite soon wear off, the lumps becoming smooth and more or less spherical pebbles. This shows how active and thorough the test is. The dust and small particles of granite which are detached, during the operation sift through perforations 24 into the compartment 25, and may be removed from time to time through the doors 26. I am able not only to quickly obtain very definite data as to the durability and strength of shovels made of various materials, but my machine is also valuable for making comparative tests of shovels. That is, by mounting the shovels to be compared on the several arms, they are tested simultaneously under identical conditions and thus the relative merits of the shovels are shown with indisputable accuracy. The facility with which shovels can be tested by my method cannot fail to benefit the art of making shovels. It substitutes a reliable, scientific method, which may be carried out in a few hours or days, yielding definite and accurate data, for the old way of trying out proposed improvements in the field, with the consequent delay and uncertainty, to say the least, in the data obtained.

It is not necessary to describe the speed reducing device 12 in detail, as such devices are well known and can be obtained in the market. The same is true of the shock absorbing device 13. This latter device plays an important part, however, in my method, as it saves the shovels from violent shocks and abuses such as they would rarely or never have to sustain in actual practice. This is particularly true where the testing material is used in lumps, as in the case of the granite referred to. A mass of broken granite has not only considerable inertia, but friction also plays a large part. That is, the friction of the lumps rubbing against each other must be overcome by the shovels, in addition to the friction of the lumps on the shovels themselves. Interposition of a shock absorber between the source of power and shovels is therefore useful as a means of protecting both the shovels and motor. In fact, it protects the whole apparatus.

While it is not necessary to operate the testing machine at any particular speed, it is desirable, of course, to run it at as high a speed as possible consistent with the conditions which obtain and the results desired. In practice I have found a velocity of about one hundred seventy-five feet per minute for the cutting edge of the blade satisfactory. The revolution counter 29 is a valuable feature of my machine, as it is useful in keeping track of the tests and relative results obtained.

Another valuable adjunct is a graphic watt meter placed in the motor circuit. This is shown diagrammatically at 40 in Fig. 1. Figure 5 shows a fragment of a chart, in which vertical lines 41 represent units of energy, in the present case kilowatts. The chart is moved past the recording style at a known velocity and sufficiently fast to segregate the curves of the graph, each of which shows the energy consumed in forcing a shovel through the mass of material contained in the hopper. The graph is sketched free hand and without any attempt at indicating the actual energy consumed. It will be seen, however, that by means of this watt meter very accurate and instructive data may be obtained; furthermore, tests made at different times may be co-ordinated, and any question as to the relative conditions attending different tests may be settled by reference to the charts of the respective tests.

While I have fully described that which I now regard as the preferred mechanism for carrying out my shovel testing method, it may be that other means can be found for putting it into effect. Furthermore, the means here disclosed for testing shovels may be varied in some of its details, without departure from the spirit of my invention as defined by my claims.

What I claim is as follows:

1. The method of testing shovels, which comprises causing the shovels to dig repeatedly through a quantity of material by force applied substantially as force is applied to a shovel in normal use, while recording the energy used in forcing the shovel through the material.

2. The method of testing shovels, which comprises causing the shovels to dig repeatedly through a quantity of material by force applied through the handles of the shovels, the shovels being moved by a suitable motor or other source of power but protected from shock by a shock absorbing medium whereby motion is transmitted from the motor to the shovels.

3. The method of testing the blade of a shovel and also the straps by which the handle is secured to the blade, which method comprises causing the blade to dig repeatedly through the same mass of material by measurable force applied in a manner which subjects the blade and straps to strain and attrition substantially like that to which the shovel would be subjected in real service.

4. Apparatus for testing shovels, comprising a hopper containing material adapted to try the strength and durability of a shovel, and means comprising members to which the handles of the shovels are attached, whereby the shovels are made to dig repeatedly through said material, thereby subjecting the shovels as a whole to wear and mechanical strain approximately such as they may be subjected to when in actual service.

5. A machine for testing shovels, comprising a hopper, a shaft mounted to rotate in said hopper, arms radiating from the shaft, means for attaching the handles of shovels to said arms so that as the shaft rotates the shovels will dig through whatever material the hopper contains in substantially the manner in which they would dig in similar material when used manually, thereby subjecting the shovels to substantially the same attrition and tensile strain they will be subjected to when in practical use.

6. A machine for testing the durability of shovels, comprising a hopper, a shaft mounted to rotate therein, arms radiating from said shaft, clamps carried by said arms to receive the handles of the shovels whereby to mount a shovel on each arm in such a position that as the shaft rotates the shovels will be caused to dig through whatever material the hopper contains in substantially the manner in which they would be made to dig in similar material when used manually.

7. A machine for testing the strength and durability of shovels, comprising a hopper, a shaft mounted to rotate therein, arms radiating from said shaft, means for mounting a shovel on each arm in such a position and in such a manner that as the shaft rotates the shovels will be caused to dig through whatever material the hopper contains, and by force applied in substantially the same way as that by substantially the manner in which they would be made to dig in similar material when used manually, a motor for rotating the shaft, and a shock absorbing coupling between the motor and shaft.

8. A machine for testing the strength and durability of shovels, comprising a hopper, a shaft mounted to rotate therein, arms radiating from said shaft, means for mounting a shovel on each arm in such a position that as the shaft rotates the shovels will be caused to dig through whatever material the hopper contains, in substantially the manner and by force applied in substantially the same way as that by which they would be made to dig in similar material when used manually, and a counter for recording the number of revolutions the shaft makes.

9. Apparatus for testing shovels, comprising a hopper containing material adapted to try the strength and durability of a shovel, means for causing the shovel to dig through said material repeatedly, so as to subject it to substantially normal strain and attrition and means for measuring and recording the energy consumed in forcing each shovel through the material.

JOSEPH WALTER BROWNING.

CERTIFICATE OF CORRECTION.

Patent No. 1,629,858.                                                     Granted May 24, 1927, to

JOSEPH WALTER BROWNING.

It is hereby certified that error appears in the printed specification of the above numbered patent requiring correction as follows: Page 3, line 115, claim 7, beginning with the word "and" strike out all to and including the word "in" in line 117, and insert instead "in substantially the manner and by force applied in substantially the same way as that by"; and that the said Letters Patent should be read with this correction therein that the same may conform to the record of the case in the Patent Office.

Signed and sealed this 14th day of June, A. D. 1927.

M. J. Moore,

Seal.                                                             Acting Commissioner of Patents.